Oct. 10, 1933.    M. B. MOUNT    1,929,510
FILTER
Filed Dec. 30, 1930    3 Sheets-Sheet 1

INVENTOR
M. BLAKE MOUNT.
BY
Victor D Borst
ATTORNEY

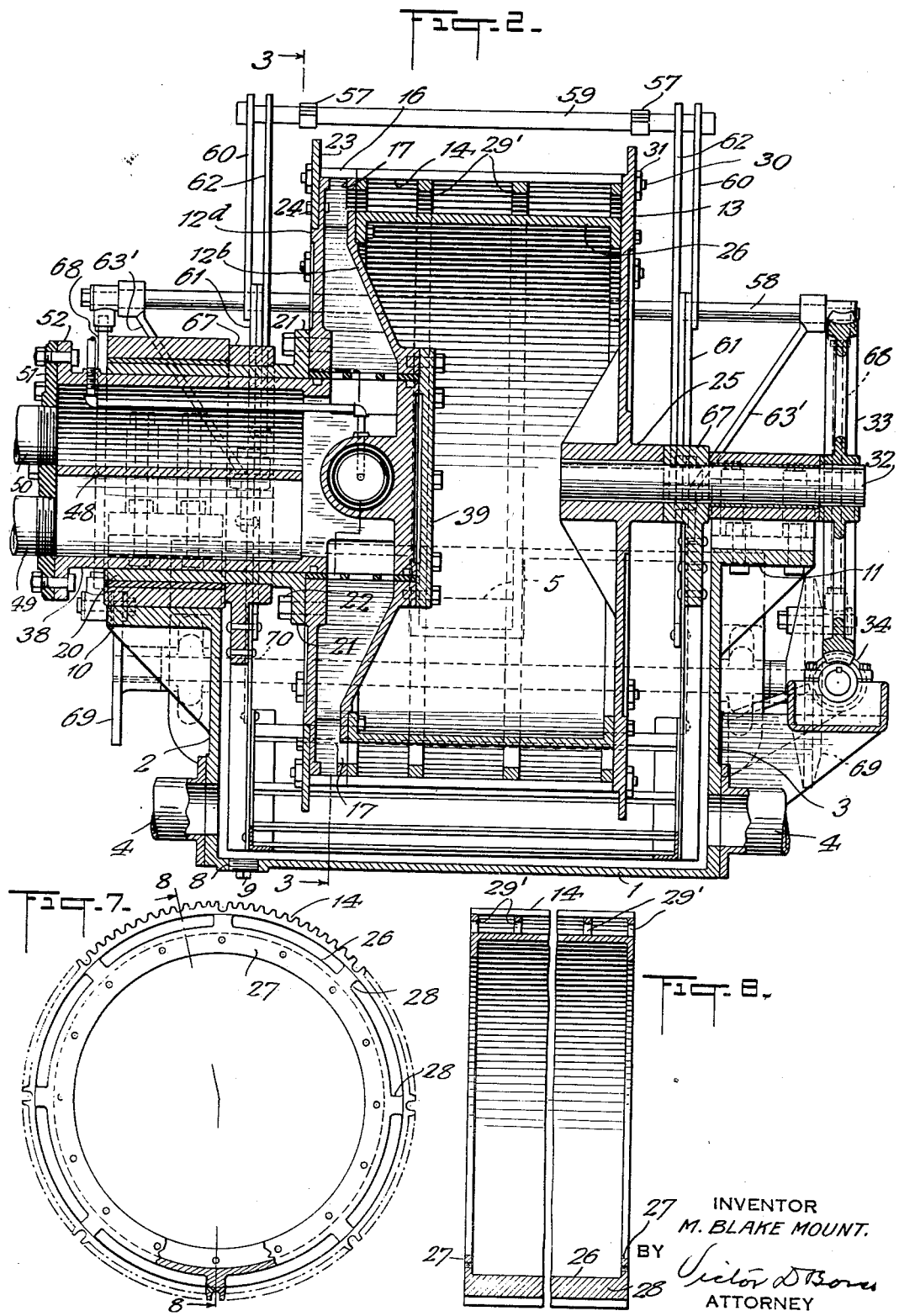

Oct. 10, 1933.    M. B. MOUNT    1,929,510
FILTER
Filed Dec. 30, 1930    3 Sheets-Sheet 3
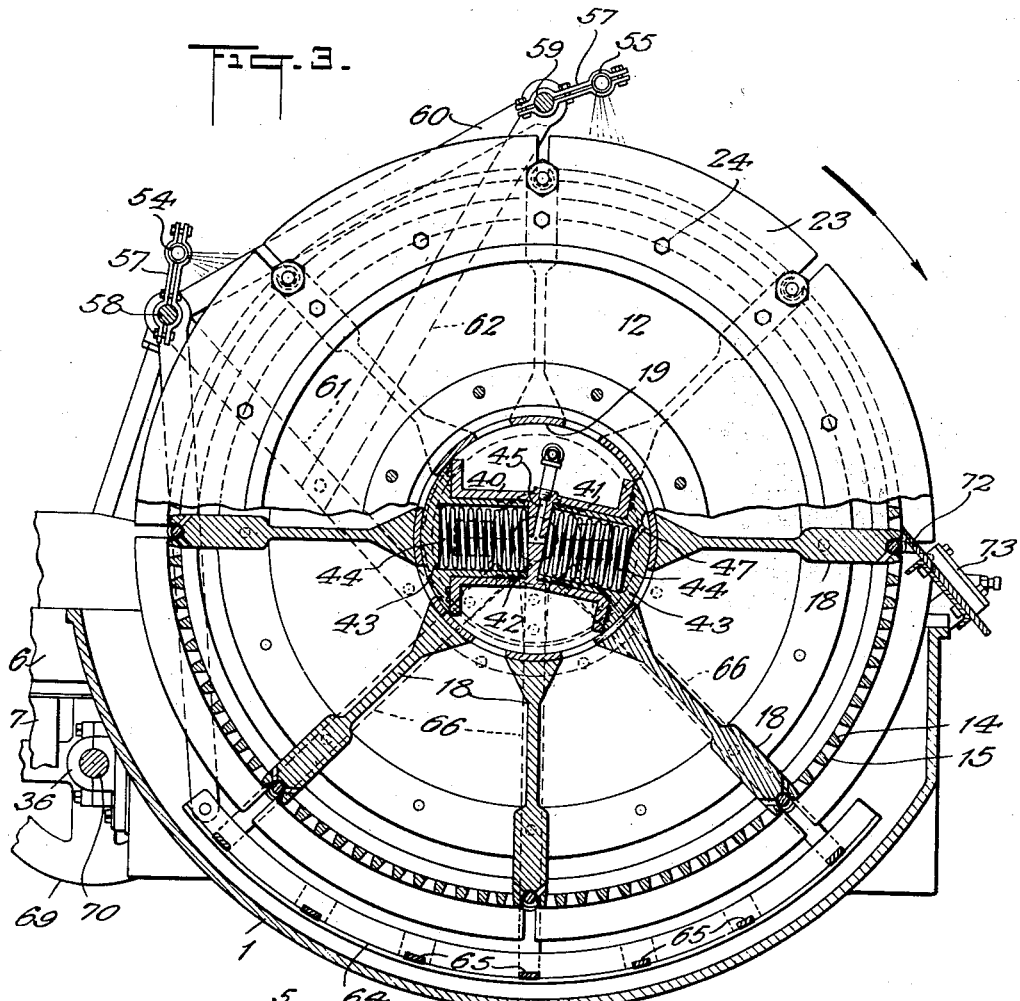
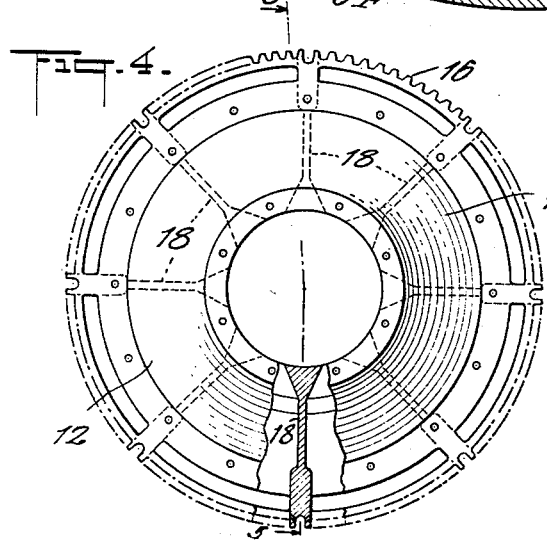
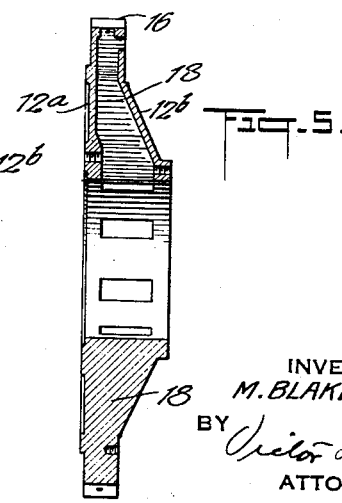
INVENTOR
M. BLAKE MOUNT.
BY
ATTORNEY Patented Oct. 10, 1933

1,929,510

UNITED STATES PATENT OFFICE 1,929,510

FILTER

Morris Blake Mount, Lynchburg, Va.

Application December 30, 1930
Serial No. 505,509

4 Claims. (Cl. 210—199)

My invention relates to filters, and in particular to continuous filters of the rotary drum type. The general features of such filters include a substantially semi-cylindrical trough into which the material to be filtered is delivered, and a drum which dips into the trough. The drum is usually rotatably mounted on a substantially hollow shaft which extends across the trough and which is supported by the sides of the trough. The periphery of the drum constitutes the filtering medium. Radial passages extending from the periphery of the drum communicate through ports with the hollow shaft which is connected to a source of reduced pressure for creating a suction at the periphery of the drum. Communication between the hollow shaft and the passages of the drum through the ports is controlled, to properly lead off the filtrate and other fluids in the operation of the filter, by the rotation of the drum. As shown in the Patent #1,348,036, granted to William D. Mount, July 27, 1920, the filter drum of the prior art is usually cast as an integral unit, hollow spokes constituting the passage between the periphery of the drum and the hollow shaft. These cast drums are not only large and expensive but are also heavy and difficult to handle in the machining of the drums and the assembly of the filter.

An object of my invention is to improve, in general, the construction of such filters. Another object of my invention is to provide a drum for such filters that is simple in construction; that may be economically manufactured; and, that is efficient in operation.

In accordance with my invention I provide a drum which is made up of several sections. I employ an outer filter drum the periphery of which is formed by a filter cloth, and an inner drum of a diameter to form a chamber between the drums. The chamber between the drums is connected to a source of reduced pressure in order to create a suction at the periphery of the drum.

Specifically, the filter embodying my invention employs a suction head and a drive head which constitute the ends of the drums, the heads being common to the inner and outer drums. The periphery of the outer drum is formed by a filter cloth which is supported by grids, and the periphery of the inner drum is solid. Extending radially from the periphery of the inner drum, are a plurality of partitions which divide the annular space between the inner and outer drums into a plurality of chambers. The suction head is hollow and is provided with a plurality of radial partitions, one in the plane of each partition extending from the periphery of the inner drum and making a fluid tight connection therewith. In this way, each of the chambers formed between the inner and outer drums, is in communication with a passage formed between two succeeding partitions in the suction head. The suction head is provided with a lateral hollow trunnion at the center thereof which is journalled in a bearing on the side of the trough of the filter. Within this trunnion there is a valve which controls communication between the passage in the suction head and the source of suction. The drive head of the drum is a disk having a hub at the center thereof. Secured to the hub there is a shaft which is journalled in and extends beyond the bearing on the side of the trough. Through this shaft the filter drum is rotated in the trough.

A clearer understanding of my invention will be had from the following particular description of an embodiment thereof which is shown in the accompanying drawings in which:

Fig. 2 is a transverse sectional elevation of the same;

Fig. 3 is a sectional end elevation taken on the irregular line 3—3 of Fig. 2;

Fig. 4 is an end elevation of the suction head;

Fig. 6 is an enlarged transverse fragmentary section of the filter drum, the section being taken through one of the partitions extending from the inner drum;

Fig. 7 is an end elevation of the drum with the suction head removed; and

Fig. 8 is a transverse section of the same taken on the line 8—8 of Fig. 7.

Figures 1, 5:
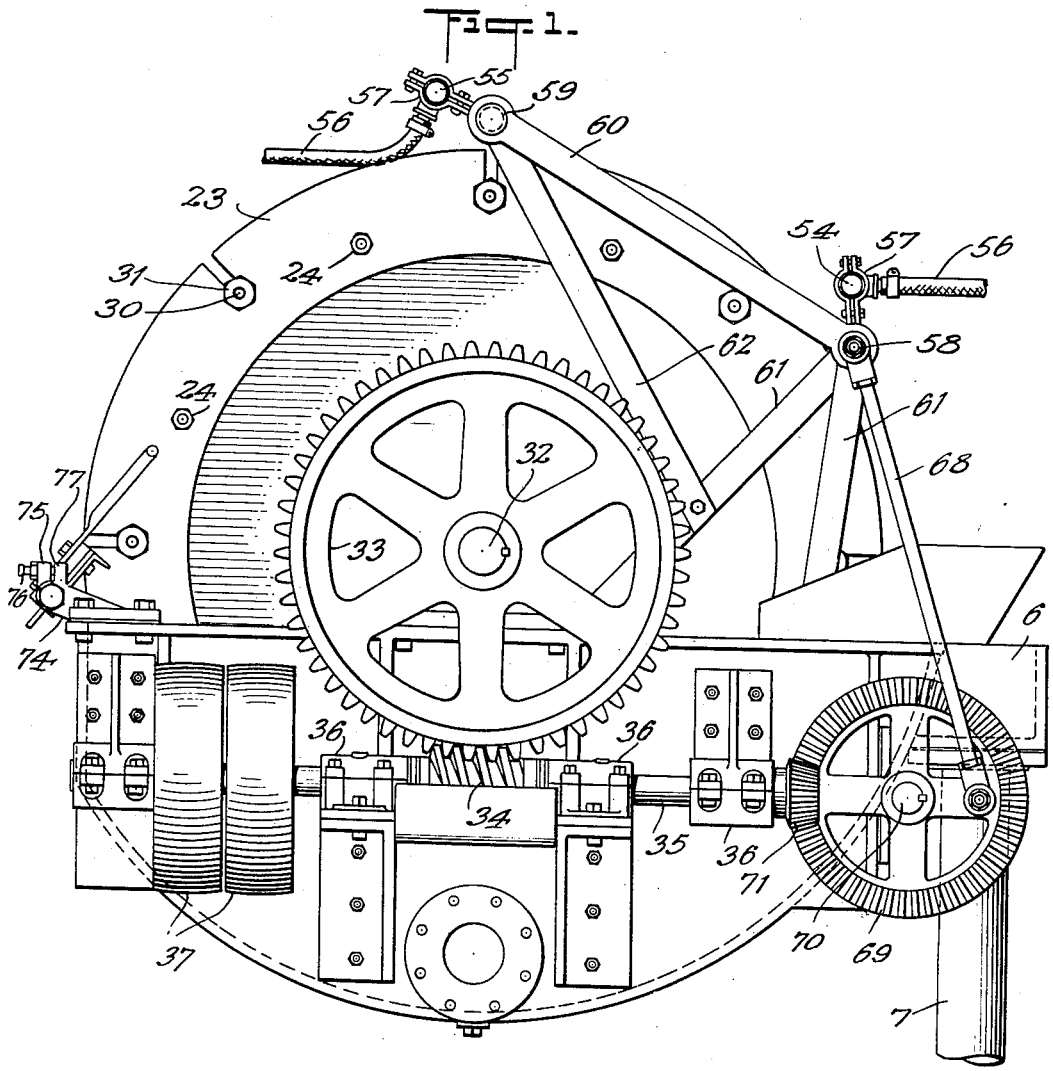
Fig. 1 is an end elevation of a continuous filter of the rotary drum type.
Fig. 5 is a transverse section of the suction head taken on the line 5—5 of Fig. 4.

The filter shown in the drawings comprises, in general, a trough into which the material to be filtered is delivered, and the filter drum which rotates in the trough and through which the filtrate is drawn. The trough 1 is substantially semi-cylindrical having end walls 2 and 3. Near the bottom of the trough, an opening is formed in the side walls which communicates with conduits 4 through which the material to be filtered is introduced into the trough. The material to be filtered is introduced into the trough continuously, and the level of the material in the trough is maintained constant by an overflow weir 5 at one end of the arcuate bottom wall of the trough. Material overflowing the weir passes into a rectangular shaped channel 6 from which it is withdrawn through an overflow conduit 7. To completely drain and clean the trough, an opening 8 is provided in the lowermost point of the trough which, when the material to be filtered is in the trough and the filter is operating, is closed by a plug 9. On the upper edge of the side of the trough at the center thereof, bearing brackets 10 and 11 are formed, the bearing bracket 10 formed on the side 2 being substantially larger than the bearing bracket 11 formed on the side 3 for a purpose which will hereinafter appear. In these bearings the filter drum is rotatably mounted.

The filter drum comprises a suction head 12, a drive head 13, a cylindrical grid 14 and a filter cloth 15. The suction head is hollow, having two end walls with aligned openings therethrough at the center thereof. The outer end wall 12a of the suction head is disk-shaped, and the inner wall 12b is substantially frusto-conical, the suction head being wider at the center than at the periphery. The periphery of the suction head is formed by a plurality of cross bars 16 substantially the shape of a gear tooth in cross section and forming a grid. The inner edge of these cross bars are reinforced by circumferential ribs 17. The inner wall of the suction head is of less diameter than the outer wall so that there is an annular space formed between the grid and the outer edge of the inner wall. Between the inner and outer walls of the suction head, there are a plurality of radial partitions 18, shown as eight in number. These partitions divide the suction head into eight radial chambers or passages. The partitions are flared circumferentially at their inner end to form restricted rectangular openings through which the passages between the partitions communicate with the opening through the center of the suction head. In the central opening through the suction head there is fitted a bushing 19 which is provided with openings constituting ports and corresponding to the restricted openings formed by the inner ends of the partitions.

A cylinder 20 having an outwardly extending flange 21 at one end is secured to the outer end wall of the suction head by bolts 22 extending through the flange 21. The cylinder extends laterally from the suction head and forms a trunnion which is journalled in the bearing bracket 10 formed in the side wall 2 of the trough. There is also an annular flange 23 secured to the outer end wall of the suction head by means of bolts 24, the inner edge of the flange abutting against a shoulder provided therefor on the wall of the suction head. This flange, which extends beyond the outer edge of the suction head, is provided with a plurality of radial slots, one in the plane of each of the partitions 18 in the suction head. The slots terminate in conical or countersunk openings. The slots and openings in the flange are provided for stretcher rods as will hereinafter appear.

The drive head 13 of the drum is a disk having a hub 25 at the center thereof. The outer edge of the drive head is also provided with radial slots ending in conical shaped holes similar to the slots and holes in the flange 24 on the suction head, and they are aligned with the radial slots in the flange.

Between the inner wall of the suction head and the drive head there is a cylinder 26 having inwardly extending flanges 27 at the ends thereof. The inwardly extending flanges of the cylinder are secured to the drive head and the inner end wall of the suction head, and with the suction head and the drive head, forms a drum of a diameter equal to the diameter of the inner end wall of the suction head. Extending from the periphery of the cylinder or inner drum 26, there are eight radial partitions 28 each lying in the plane of a partition wall 18 of the suction head. The ends of the partitions extending from the drum abut against the partitions of the suction head, a gasket 29 being interposed to form a fluid and air-tight connection between the partitions.

The cylindrical grid 14, with the suction and drive heads constitutes the outer drum. The grid is formed integral with the inner cylinder 26. In manufacturing the filter drum two coaxial cylinders are cast integral, the radial partitions 28 uniting the two cylinders and the outer cylinder having circumferential supporting ribs 29' formed on the inner surface thereof. The surface of the outer cylinder is milled, transversely thereof, to form the cylindrical grid 14, the slots being cut through the cylinder only between the supporting ribs 29.

The outer ends of each of the radial partitions 28 are grooved longitudinally thereof to receive stretcher rods 30 which stretch the filter cloth 15 over the outer faces of the grids.

The extremities of the stretcher rods pass into and through the slots formed in the drive head and the flange 23 of the suction head. As hereinbefore stated the base of these slots are conical, and they receive conical nuts 31 threaded on the ends of the stretcher rods. The conical openings are so arranged that when the nuts are set, the rods are drawn bodily towards the center of the drum and against the base of the grooves in the radial partitions. The filter cloth is stretched over the outer faces of the grid and is confined beneath the stretcher rods by means of which it is stretched and clamped in place when the stretcher rods are properly adjusted. In this position, the filter cloth is supported by the grid against internal suction and external pressure.

The drum described above is rotated in the trough through the drive head by means of a shaft 32 which extends into and is secured in the hub of the drive head and extends through and is journalled in the bearing 11 formed on the side of the wall 3. On the end of this shaft, there is a worm gear 33 which meshes with a worm 34 secured to a shaft 35 extending parallel to the side of the filter and journalled in bearing brackets 36 secured to the side of the filter. On one end of the shaft, there may be, as shown, two pulleys 37, one rotatably mounted on the shaft and the other secured to the shaft. In this instance, a belt is used to drive the filter, the belt extending around the pulley secured to the shaft when it is desired to operate the filter, and being shifted to the idler pulley when it is desired to stop the filter. This drive may, if desired, be supplanted by a motor which would be directly connected to the shaft 35 through reducing gears. As the drum rotates in the trough, the chambers formed between the inner and outer drums by the radial partitions are successively connected to a source of reduced pressure to create a suction at the periphery of the outer drum.

The connection between the compartments formed in the drum and the source of reduced pressure is controlled by a mandrel valve. The mandrel valve comprises a hollow mandrel 38 that extends through the hollow trunnion 20 of the drum and into the bushing in the suction head. The inner end of the mandrel abuts against a plate 39 that is secured to the inner end wall of the suction head and closes the opening therethrough. The portion of the mandrel within the suction head has two radial cylinders 40 and 41 which are open at the outer end and are closed at the inner end by a common wall 42. In each of these cylinders, there is a hollow piston 43 having an enlarged head. The head of the piston is pressed against the bushing 19 by means of springs 44 within the piston which act between the common wall of the cylinders and the head of the piston. In addition to the springs compressed air is let into the cylinders behind the pistons through a passage 45 in the common end wall of the cylinders. The compressed air is delivered to the passage 45 in the common wall through a conduit 46 that extends through an opening in the mandrel adjacent the outer end thereof. The piston in the cylinder 41 is provided with a passage 47 through the head thereof which is adapted to communicate with the compartments or passages in the suction head and supply compressed air to the compartments of the drum for loosening the filter cake formed on the drum.

The mandrel is divided into two sections by a horizontal diametrical partition 48 and is provided with two outlet conduits 49 and 50 each of which communicate with one of the compartments of the mandrel. These conduits are secured in the openings in a head 51 which is secured to an outwardly extending flange 52 on the end of the mandrel. Each of the conduits 49 and 50 is connected to a source of suction. It will be seen from Fig. 3 that the upper compartment of the mandrel is in communication with the upper compartments of the drum which are out of the trough and the lower compartment of the mandrel is in communication with the lower compartments in the trough. As the drum rotates the compartments are successively disconnected from one of the compartments of the mandrel and connected to the other compartment of the mandrel, the piston valves cutting off the compartments from one section and then the other as the drum is rotated in the direction indicated by the arrow. The piston valve in the cylinder 41 having an opening therethrough to deliver compressed air to the compartment is such that a compartment is cut off from both sections of the mandrel and the compressed air delivered thereto just prior to the compartment entering the trough. It will be seen that the lower compartment of the mandrel takes the filtrate directly from the trough, and the upper compartment draws wash water which is applied to the filter cake on the drum by a system of sprays.

The sprays for washing the filter cake consist of pipes extending across the drum and having sprinkler outlets. In the filter shown in the drawings, there are two of these pipes 54 and 55 which are supplied with water through flexible tubing 56. The pipes are supported by brackets 57 which are secured to supporting rods 58 and 59 extending transverse to the drum, the brackets consisting of two bars which clamp the rod and the pipe. The supporting rods are in turn supported by a system of links on either side of the drum, each system including three links which form a triangle, one of which links 60 extends between the two rods and the other two links 61 and 62 being at an angle to this latter link and connected at their point of crossing. The link 61 extending from the rod 58 supporting the spray 54 is also connected to a link which is included in the cradle of an agitator suspended over the trunnion 20 and the shaft 32. Another link 63 extending from the rod 58 is connected directly to the agitator and a brace 63' extends between the rod 58 and the hub of the agitator.

The agitator consists of two arcuate angle irons 64 which form the sides thereof and a series of cross bars 65 extending between the angle irons and secured thereto. The cradle of the agitator comprises three links 66 on either side of the agitator and extending radially towards the center of the filter. These radial links are connected to hubs 67, one of which surrounds the trunnion 20 and the other of which surrounds the shaft 32. The agitator is oscillated about the center of the filter through the spray supporting rod 58 carrying the spray 54 and the links connecting the rod to the agitator. This supporting rod is moved by connecting rods 68, one secured to each end of the rod. The connecting rods 68 are operated by cranks 69, one on each end of a shaft 70 that extends transversely of the filter. The crank on the end of the shaft at the side of the filter on which the shaft 35 is located is in the form of a bevel gear. This bevel gear meshes with the pinion 71 on the end of the shaft 35 carrying the pulleys for driving the filter drum. Through this arrangement the sprays and the agitator are oscillated.

On the end of the trough opposite to the overflow weir there is mounted a doctor blade 72 for removing the filter cake from the filter drum. This blade is mounted in a bracket 73 having trunnions journalled in bearings 74 secured on the sides of the trough. The blade is adjustable and for this purpose there is provided an upwardly extending flange 75 on the bracket 73 through which a set screw 76 extends, the set screw being in threaded engagement with the opening through the flange. An abutment 77 is provided on the bearing brackets against which the set screw acts. By turning the set screw, the relation of the blade to the filter drum may be varied. The blade is so located that the filter cake is loosened by the compressed air entering the compartment of the filter just prior to the time the compartment reaches the blade.

From the above description of the filter illustrated in the drawings, it will be apparent that I have simplified the construction of such filters while at the same time providing a more sturdy and effective filter.

It is obvious that various changes may be made in the details of the embodiment shown in the drawings and described immediately above by those skilled in the art within the principle and scope of my invention as expressed in the appended claims.

I claim:

1. In a rotary filter, a filter drum comprising a cylindrical grid adapted to support a filter cloth, an inner solid cylinder of lesser diameter than the cylindrical grid, partitions extending between the grid and the cylinder and dividing the annular space therebetween into a plurality of compartments, a hollow end piece for the filter drum having an inner and outer wall, the inner wall being substantially the same diameter as the solid cylinder and the outer wall being substantially the same diameter as the cylindrical grid, radial partitions extending between the walls of the end piece forming a plurality of passages therein, said partitions extending to the periphery of the outer wall, and a grid section on the outer end of said end piece forming a continuation of the cylindrical grid.

2. In a rotary filter, a filter drum comprising a cylindrical grid adapted to support a filter cloth, an inner solid cylinder of lesser diameter than the cylindrical grid having an inwardly extending flange on the edge thereof, radial partitions extending between the grid and the cylinder dividing the annular space therebetween into a plurality of compartments, a series of circumferential reinforcing ribs on the under side of said grid, a hollow end piece for the filter drum having an inner and outer wall, the inner wall being substantially of the same diameter as the solid cylinder and being secured to the flange thereon and the outer wall being substantially of the same diameter as the cylindrical grid, radial partitions extending between the walls of the end piece forming a plurality of passages therein and the edges thereof above the inner wall abutting against the ends of the partitions between the grid and the cylinder, a grid section on the outer end of said end piece forming a continuation of the cylindrical grid, and a reinforcing circumferential rib on the end of said grid section abutting against a similar rib on the cylindrical grid.

3. In a rotary filter, a filter drum comprising a cylindrical grid adapted to support a filter cloth, an inner solid cylinder of lesser diameter than the cylindrical grid, lateral flanges on the ends of said inner solid cylinder, partitions extending between the grid and the cylinder and dividing the annular space therebetween into a plurality of compartments, a hollow end piece for the filter drum having an inner and outer wall, the inner wall being substantially the same diameter as the solid cylinder and the outer wall being substantially the same diameter as the outer grid and the inner wall having an annular radial surface abutting against the flange on the end of the inner solid cylinder, radial partitions extending between the walls of the end piece and forming a plurality of passages therein, said partitions extending to the periphery of the outer wall, and a grid section on the outer end of said end piece forming a continuation of the cylindrical grid.

4. In a rotary filter, a filter drum comprising a cylindrical grid adapted to support a filter cloth, an inner solid cylinder of lesser diameter than the cylindrical grid having an inwardly extending circumferential flange on the edge thereof, radial partitions extending between the grid and the cylinder dividing the annular space therebetween into a plurality of compartments, a series of circumferential reinforcing ribs on the under side of said grid including one positioned at the end of the grid and having one side in the plane of the surface of the inwardly extending flange of the inner cylinder, a hollow end piece for the filter drum having an inner and outer wall, the inner wall being of substantially the same diameter as the solid cylinder and being secured to the flange thereof and the outer wall being substantially of the same diameter as the cylindrical grid, radial partitions extending between the walls of the end piece forming a plurality of passages therein and the edges thereof extending above the inner wall abutting against the ends of the partitions between the grid and the cylinder, a grid section on the outer end of said end piece forming a continuation of the cylindrical grid, and a reinforcing circumferential rib on the end of said grid section abutting against the rib on the edge of the cylindrical grid.

M. BLAKE MOUNT.